United States Patent [19]

Follows et al.

[11] Patent Number: 4,591,468

[45] Date of Patent: May 27, 1986

[54] PROCESS FOR REMELTING POLYAMIDES

[75] Inventors: Gordon W. Follows; Christopher G. Hart; John Massey, all of Harrogate, England

[73] Assignee: Imperial Chemical Industries PLC, Great Britain

[21] Appl. No.: 477,684

[22] Filed: Mar. 22, 1983

[30] Foreign Application Priority Data

Mar. 28, 1982 [GB] United Kingdom ................. 8212238

[51] Int. Cl.$^4$ ...................... B29B 13/02; B29C 47/78; B29C 47/92

[52] U.S. Cl. .................................. 264/40.1; 264/211; 264/349

[58] Field of Search ........... 264/40.5, 210.6, DIG. 61, 264/211, 349, 40.1, 40.7

[56] References Cited

U.S. PATENT DOCUMENTS

| | | | |
|---|---|---|---|
| 2,943,350 | 7/1960 | Rodenacker | 264/85 |
| 3,389,549 | 1/1966 | David | 264/210.6 |
| 4,066,725 | 1/1978 | Boettner | 264/40.5 |
| 4,301,105 | 11/1981 | Coleman et al. | 264/205 |
| 4,381,272 | 4/1983 | Ehritt | 264/40.5 |

FOREIGN PATENT DOCUMENTS

| | | |
|---|---|---|
| 2451476 | 5/1975 | Fed. Rep. of Germany . |
| 47-08524 | 3/1973 | Japan . |
| 48-23197 | 7/1973 | Japan . |
| 48-33766 | 10/1973 | Japan . |
| 49-023589 | 6/1974 | Japan . |
| 4083825 | 6/1974 | Japan . |
| 1095706 | 12/1967 | United Kingdom . |
| 1323963 | 7/1973 | United Kingdom . |
| 2074500 | 11/1981 | United Kingdom . |
| 568611 | 9/1977 | U.S.S.R. . |

Primary Examiner—Jan Silbaugh
Attorney, Agent, or Firm—Scully, Scott, Murphy & Presser

[57] ABSTRACT

In a process for the production of a shaped article involving the remelting of a polyamide which has been subjected to a drying stage, such as that which occurs during solid phase polymerisation, the stage of conditioning the polyamide prior to remelting can be reduced or even avoided by adding a controlled amount of water to the polymer when molten or immediately prior to its remelting.

18 Claims, 1 Drawing Figure

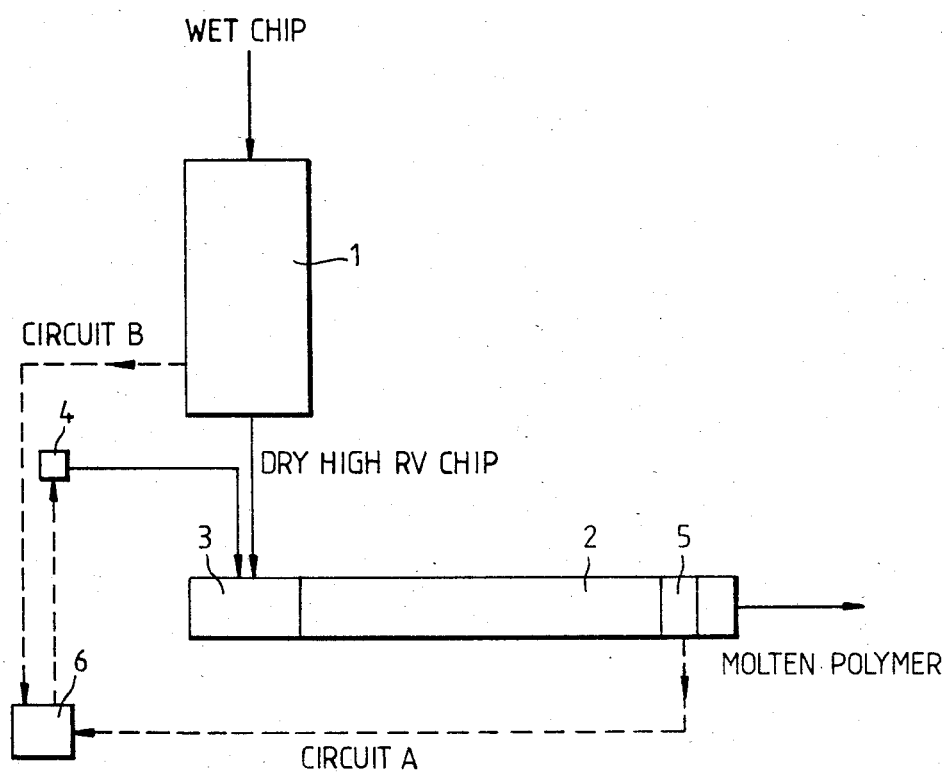

PROCESS FOR REMELTING POLYAMIDES

This invention relates to a process for melting polyamide polymer.

For many years now, shaped articles, such as fibres and films, have been manufactured from polyamide polymers. It is well established practice in the manufacture of such articles to feed solid polymer, which is often in the form of granules or chips to an extruder to remelt the polymer and subsequently to extrude the molten polymer into the desired form. Normally a non-vented extruder is used in this process.

Polyamides are well known to absorb moisture, and if polymer containing an excessive amount of moisture is remelted in a non vented extruder, then it undergoes depolymerisation, resulting in the final shaped product having reduced physical properties. On the other hand, if the polymer contains no, or only a slight amount of moisture, it undergoes further polymerisation during remelting, again resulting inn a change in physical properies of the shaped product. It is therefore necessary to control the moisture content of the polymer to ensure that a product of constant properties is produced. This can readily be achieved by using polymer which has been allowed to equilibrate with a controlled amount of moisture, by, for example, exposure to an inert gas of controlled moisture content. The conventional conditioning processes are carried out at relatively low temperatures which therefore require prolonged times for equilibrium to be reached. The continuous operation of such a process requires a large inventory of polymer and the equipment to store the polymer for these prolonged times.

As an example of the operational conditions used, British Patent Specification No. 1 095 706 describes a process for the production of shaped articles formed from polycaprolactam having an improved molecular weight uniformity, wherein the washed and dried polymer is exposed to a moist gas for at least 2 days at a temperature between 30° and 120° C.

There is therefore a need for a process for the conditioning of polyamide polymers which only requires a short time of contact with water. We have now found that there is no need to ensure that before remelting takes place the water is uniformly diffused through the polymer, and the required amount of water can be added to the polymer prior to its remelting to produce a shaped article or even when it has been remelted. Consequently the time for conditioning can be reduced to quite short periods of time or even eliminated. In the case where the water is added to the polymer prior to melting, conditioning periods of less than 10 hours, more frequently less than 8 hours, and even less than 5 hours are possible.

The addition of water to polyamides prior to spinning has been described beforehand but in these cases it has been to overcome problems other than those associated with conditioning. Thus, British Patent Specification No. 1 323 963 describes a process for the extrustion of polycaprolactam produced using an alkaline catalyst in which the conventional washing stage to remove unreacted monomer can be eliminated. In this process, 0.1 to 10 moles of water per mole of catalyst is added to the polycaprolactam before the extrusion stage. Soviet Union Patent Specification No. 568 661 describes a somewhat similar process for the elimination of the washing of polycaprolactam. This is achieved by steaming the polymer for 2 hours at 260° C. with super heated steam until the polymer contains 0.3 weight percent of water. In British Patent Specification No. 2 074 500A, an improved process is described for the spinning of nylon-4 or poly(polymethylene terephthalamide) in which the polymer is mixed with 5-25% of water before being melt spun under conditions which produce a single phase fusion melt of the polymer and water.

According to the present invention there is provided a process for remelting polyamide polymer, the process being characterised by a controlled amount of water being added to the polymer when molten or immediately prior to its remelting.

By the term "remelting" is meant any process in which the polyamide polymer is subjected to a melting stage after its production by a melt condensation process. The term includes melt spinning used in the manufacture of fibres and melt extrusion used in the production of shaped articles.

The amount of water added to the polymer will be dependent upon the relative viscosity of the feed polymer and its moisture content, and also on the required relative viscosity of the molten polymer. In many instances the amount of water will be that required to produce equilibrium conditions. This amount can be determined before hand by well known methods, or it can be found by trial and error. In the case where melting takes place in a screw-extruder, the water may be added at a point along the screw of the extruder prior to or at the position where the polymer begins to melt, for example, at the feed section of the screw.

Polymers suitable for processing according to the present invention include poly(hexamethylene adipamide) and its copolymers, and poly $\epsilon$-caprolactam and its copolymers. The present process is particularly suitable for the melt processing of polyamides which have been subjected to solid phase polymerisation in order to raise its molecular weight. In such a polymerisation process, the solid polymer in granular form is heated to elevated temperatures, and the volatile products of polymerisation are removed either by the application of a vacuum or by purging with an inert gas. In such a process, the water in equilibrium with the polymer is removed, and consequently, in order to achieve satisfactory remelting of the polymer, e.g. to avoid further polymerisation, it is necessary to allow the polymer to equilibrate with a controlled amount of moisture. As discussed above, existing practices require prolonged times, but the process of the present invention enables the polymer to be remelted almost immediately.

Therefore, according to a further aspect of the present invention, there is provided a process for the production of a shaped article formed from a polyamide polymer wherein the polymer is remelted and formed into the said article, characterised in that the polymer in granular form is subjected to an elevated temperature under conditions for the removal of volatile products to increase its molecular weight, after which a controlled amount of water is added to either (a) the granules in a manner whereby the water is uniformly distributed throughtout the bulk of the granules, and the polymer is then remelted before the water has completely diffused through each granule or (b) to the molten polymer.

Where the water is added to the dried polymer granules, it may be added batch-wise or continuously. Thus, in the case where the polyamide polymer has been dried (or solid phase polymerised) batchwise, e.g. by tumbling, after the completion of the drying and cooling of the polymer, the controlled amount of water may be added to the polymer whilst still in the tumbler. Tumbling is then continued for a short period of time, sufficient to ensure that the water is uniformly distributed throughout the bulk of the granules, but insufficient to allow the water to become uniformly diffused through each granule, i.e. equilibrium conditions are not achieved. By this time the polymer is ready for remelting, e.g. for melt extruding for the production of fibres or shaped articles.

When the controlled amount of water is added continuously, it is preferred that the addition is made whilst the polymer is being melted in an extruder, especially a non-vented extruder. When a screw-extruder is used to remelt the polymer, the water is added at a point along the barrel of the extruder prior to or at the position where the polymer melts, for example at the feed section of the screw.

The water in liquid or vapour form may be added manually, or it may be metered in by a metering pump. In one embodiment of the invention, the extruder includes a means for metering the water to the polymer and a means for detecting any deviation in the viscosity of the molten polymer from a set value. When a deviation in the viscosity is detected, the detecting means emits a signal to the water metering means, whereby the amount of water metered to the polymer is adjusted to correct the deviation. In an aternative embodiment of the invention, the means for detecting any deviation in the viscosity of the molten polymer is replaced by a means for detecting any deviation in the pressure required to force the molten polymer through the extrusion orifice.

The invention is more fully illustrated by the following examples and by reference to the FIGURE which is a line diagram of a particular embodiment.

EXAMPLE 1

In this example, polyamide chip is dried and solid phase polymerised continuously, and is then continuously fed to and melted in an extruder. A line diagram of the apparatus used is shown in the FIGURE.

Referring the FIGURE, standard, wet polyamide chip having a relative viscosity within the range 40 to 50 units (measured as an 8.4% w/w solution in 90% formic acid), is fed into the top of a solid phase polymerisation vessel (1) maintained at a temperature of about 170° C., and dry nitrogen gas, heated to a temperature of 170° C., is passed from the base of the vessel upwards to remove the volatile products resulting from polymerisation. The size of the vessel and the flow rate of the chip is such that the dwell time of the polymer is of the order of 5 hours. Dry polymer chip having a relative viscosity of the order of 65 to 75 units is withdrawn from the base of the solid phase polymerisation vessel and is fed directly into a non-vented extruder (2). Within the feed zone of the extruder (3), there is located an injection point through which water is metered from a pump (4). Before the molten polymer is extruded, it passes through a conventional melt viscosity measuring device (5) which monitors the viscosity of the molten polymer. Any deviation of the melt viscosity from a set value initiates an electric signal via circuit A to a control box (6) which, in turn, sends a signal to the injection pump (4) either to increase or decrease the amount of water being injected into the extruder, depending on whether the viscosity of the molten polymer is higher or lower than the set value, respectively.

In an alternative form, the water may be injected into the non-vented extruder at a position where the polymer is molten.

When polymer is remelted in the apparatus shown in the FIGURE, the molten polymer immediately prior to extrusion has a viscosity of essentially constant value. The viscosity value may be the same as or higher or lower than that of the dried polymer being fed to the extruder, depending on the amount of water being injected.

The above described process may be modified by incorporating a means of monitoring the conditions within the solid phase polymerisation vessel, such as temperature. When the conditions deviate from set values, a signal is tranmsitted via ciruit B to the control box, and hence to the metering pump in order to adjust the amount of water being injected into the extruder. In this way, changes in the viscosity of the feed polymer arising from changes in the conditions within the polymerisation vessel may be compensated for.

The following examples illustrate a batch-wise operation of the process of the present invention.

EXAMPLE 2

500 kg of regular cut nylon 66 polymer containing 0.5% moisture and having a relative viscosity of 46 (measured as an 8.4% w/w solution in 90% formic acid), was charged to an oil jacketted double cone APEX ROTARY DRIER. After evacuating, purging with nitrogen and re-evacuating the drier to exclude oxygen, the drier was set in rotary motion, heat was applied to the external reservoir of HYGROTHERM oil, and cirulation of the heated oil through the jacket was commenced. The oil temperature was set to control at 190° C. and the vessel was rotated and maintained under a low internal pressure, of 5 mm/Hg, and the polymer temperature was monitored throughout the whole operation.

A polymer temperature of 190° C. was achieved after 7.75 hours by which time all the moisture had been removed and the polymer was dry. The HYGROTHERM oil in the reservoir was then force cooled, and the cooled oil circulated around the jacket of the drier to cool the polymer as quickly as possible. When the polymer temperature had fallen to 50° C., the vessel was isolated from the vacuum system and 0.375 kg of water was carefully introduced into the vessel as it continued to rotate under vacuum. Mixing was continued for a further 2 hours, and then the vacuum was broken using nitrogen of low dew point and the polymer was discharged to a spinning hopper. The polymer had an RV of 88.5. The thus produced polymer was remelted in a non-vented screw extruder, with a residence time in the melt of 5 minutes, and spun into filaments. The yarn thus obtained was found to have an RV of 87.2, i.e. a decrease of only 1.3 RV units.

COMPARATIVE EXAMPLE A

Example 2 was repeated except that no water was added to the solid phase polymerised polymer. The resulting filaments had an RV of 97.2, i.e. an increase of 8.7 RV units.

EXAMPLE 3

Example 2 was repeated except that the cooling stage was begun after 6.25 hours, by which time the polymer had reached a temperature of 180° C. When the temperature had fallen to 132° C., 0.36 kg of water was introduced in a controlled manner, and the polymer was discharged when it had cooled to a temperature of 60° C. The resulting polymer had an RV of 69.1, and when subjected to remelting in a non-vented extruder having a melt-residence time of 5 minutes to produce filaments, the filaments had an RV of 65.7, i.e. a decrease of 3.4 RV units.

We claim:

1. A process for remelting polyamide polymer to produce a molten polymer of set melt viscosity without prolonged preconditioning comprising adding a controlled amount of liquid water to the solid polymer, during or immediately prior to remelting within a time less than that normally required to reach equilibrium conditions, the controlled amount of water being such as to produce in said molten polymer said set melt viscosity.

2. A process according to claim 1 wherein the remelting takes place in a screw extruder.

3. A process according to claim 2 wherein the water is added at a point along the barrel of the extruder prior to the point where the polymer begins to melt.

4. A process according to claim 3 wherein a means detects any deviation in the viscosity of the extruded molten polymer from a set value and adjusts the amount of water added to the polymer to correct the deviation.

5. The process of claim 1, wherein the controlled amount of water is that required to attain equilibrium conditions in said molten polymer at said set melt viscosity.

6. A process according to claim 1 or 5, wherein the polymer has been subjected to a drying stage and has not been allowed to re-equilibrate with moisture.

7. A process according to claim 1 wherein the water is added to the polymer before being charged to an extruder.

8. In a process for the production of a shaped article formed from a polyamide polymer wherein the polymer is remelted and formed into the said article, the improvement comprising subjecting said polymer in granular form to an elevated temperature under conditions for the removal of volatile products to increase its molecular weight, and thereafter adding that controlled amount of water required to reach equilibrium conditions for a set melt viscosity of said polyamide polymer either (a) to the granules in a manner whereby the water is uniformly distributed throughout the bulk of the granules, and then remelting the polymer before the water has diffused completely through each granule and equilibrium conditions for such set melt viscosity has been reached or (b) to the molten polymer during remelting.

9. A process according to claim 8 wherein the remelting of the polymer occurs within 10 hours from the addition of the water.

10. A process according to claim 8 wherein the remelting of the polymer occurs within 8 hours from the addition of the water.

11. A process according to claim 8 wherein the remelting of the polymer occurs within 5 hours from the addition of the water.

12. A process according to claim 11 wherein the water is added batchwise to the granular polymer, and the granules are agitated until the water is uniformly distributed throughout the bulk of the granules.

13. A process according to claim 11 wherein the water is continuously metered to the polymer in the remelting unit.

14. A process according to claim 13 wherein the remelting unit is a non-vented screw extruder.

15. A process according to claim 14 wherein the water is added at a point along the screw of the extruder prior to the region where the polymer begins to melt.

16. A process according to claim 14 wherein the extruder includes a means for metering the water to the polymer and a means for detecting any deviation in the viscosity of the molten polymer from a set value, any deviation actuating the said means to emit a signal to the metering means, whereby the amount of water metered to the polymer is adjusted to correct the deviation.

17. A process according to claim 14 wherein the extruder includes a means for metering the water to the polymer and a means for detecting any deviation from a set value of the pressure required to force the molten polymer through the extrusion orifice, any deviation actuating the said means to emit a signal to the metering means, whereby the amount of water metered to the polymer is adjusted to correct the deviation.

18. A process according to claim 13 wherein the increase in molecular weight of the polymer in granular form is by a continuous process which includes a means for monitoring at least one of the conditions thereof, and any deviation of the condition from a set value causes the monitor to emit a signal which adjusts the amount of water added to the polymer in the remelting unit, whereby any change in the viscosity or pressure of the molten polymer arising from the deviation of the said process condition is reduced or eliminated.

* * * * *